United States Patent [19]

Suzuki et al.

[11] 4,252,343
[45] Feb. 24, 1981

[54] ANCHOR DEVICE FOR SEATBELT SYSTEMS

[75] Inventors: Ichiro Suzuki; Masanao Motonami; Hisashi Ogawa, all of Aichi, Japan

[73] Assignee: Toyota Jidosha Kogyo Kabushiki Kaisha, Aichi, Japan

[21] Appl. No.: 37,102

[22] Filed: May 8, 1979

[30] Foreign Application Priority Data

Aug. 18, 1978 [JP] Japan .......................... 53-114162[U]

[51] Int. Cl.³ .............................................. B60R 21/10
[52] U.S. Cl. ...................................... 280/804; 280/808
[58] Field of Search ................ 280/804, 802, 803, 808

[56] References Cited

U.S. PATENT DOCUMENTS

| | | | |
|---|---|---|---|
| 3,856,327 | 12/1974 | Otani | 280/802 |
| 4,039,224 | 8/1977 | Bauer | 280/804 |
| 4,053,175 | 10/1977 | Kato et al. | 280/803 |
| 4,061,365 | 12/1977 | Nagano | 280/804 |
| 4,174,865 | 11/1979 | Doveinis | 296/146 |

*Primary Examiner*—John J. Love
*Assistant Examiner*—Donn McGiehan
*Attorney, Agent, or Firm*—Koda and Androlia

[57] ABSTRACT

An anchor device for a seatbelt system which includes an anchor plate which is U-shaped in cross-section when seen from the front of a vehicle and which has an outer end of a passenger restraining belt fastened to one side thereof and a runner piece coupled to the other side of said anchor plate. A roof lining is inserted into the central region of the U-shaped anchor plate and the runner piece together with the anchor plate moves along said roof side whereby when the runner piece has moved as far forward as possible along the roof side, the outer end of the belt is moved further towards the front of the vehicle than the runner piece to provide a sufficient space for the passenger to enter or exit the vehicle.

9 Claims, 4 Drawing Figures

ANCHOR DEVICE FOR SEATBELT SYSTEMS

BACKGROUND OF THE INVENTION

1. Field of the Invention

This invention relates to anchor devices for seatbelt systems and more particularly to anchor devices utilized in seatbelt systems which automatically fasten the belt about the passenger.

2. Prior Art

Seatbelt systems, by restraining the passenger using a belt during a vehicular emergency, prevent the passenger from hitting dangerous objects and greatly increase the safety of the passenger. However, for reasons such as the difficulty in fastening the belt, etc. the number of seatbelt wearers is very low. As a result, passive seatbelt systems have been proposed which automatically fasten the belt about the passenger after he has seated himself.

These passive seatbelt systems have the outer end of the passenger restraining belt fastened to a truck by an anchor plate. By causing the truck to move forward or backward along the roof side of the vehicle, the belt is caused to approach or leave the passenger's seat to thereby automatically fasten or unfasten the belt about the passenger.

In such automatic fastening seatbelt systems, in order that the entrance or exit of the passenger is not interfered with, it is necessary that a sufficient space be formed between the belt and the passenger seat at times when the passenger is entering or exiting the vehicle. However, since the front end of the roof side connects to the front pillar of the vehicle, there is a possibility that the outer end of the belt will come into contact with the passenger when he enters or exits the vehicle even though the truck moves as far as possible towards the front of the vehicle.

SUMMARY OF THE INVENTION

Accordingly, it is a general object of the present invention to provide an anchor device for seatbelt systems which allows the belt to move far enough forward such that a sufficient space for the passenger to enter or exit is formed between the belt and the passenger seat even if the forward motion of the truck is prevented by the front pillar of the motor vehicle.

In keeping with the principles of the present invention, the objects are accomplished by a unique seatbelt system which includes an anchor device which is made in a U-shape with one end fastened to the outer end of the belt, the other end fastened to a truck and having sufficient space in the middle of the U-shaped such that the roof lining may fit into the space. Furthermore, the U-shaped anchor is designed such that even when the forward motion of the truck is stopped by the front pillar and the roof side lining, the outer end of the belt moves sufficiently far towards the front of the vehicle to provide sufficient space for the passenger to enter and exit.

BRIEF DESCRIPTION OF THE DRAWINGS

The above-mentioned features and objects of the present invention will become more apparent with reference to the following description taken in conjunction with the accompanying drawings wherein like reference numerals denote like elements and in which.

DETAILED DESCRIPTION OF THE INVENTION

Figure 1:
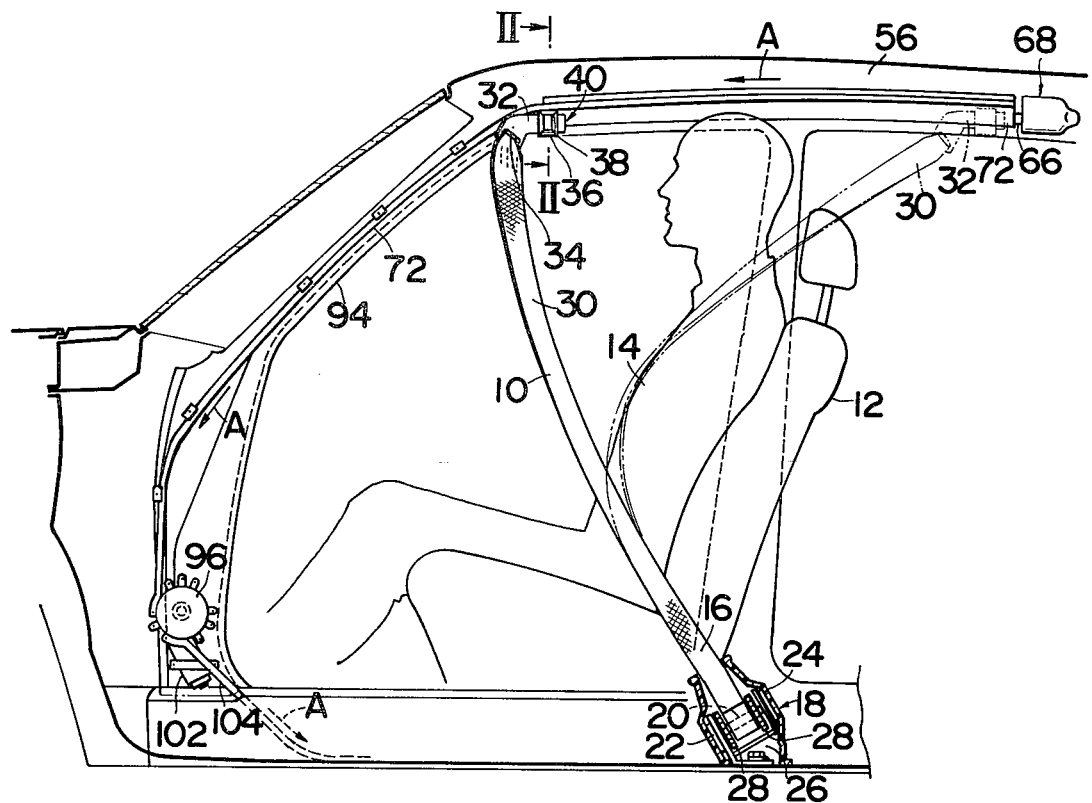
FIG. 1 is a side view of the interior of the vehicle illustrating one embodiment of an anchor device in accordance with the teachings of the present invention.

Referring more particularly to the figures, shown in FIG. 1 is a seatbelt system utilizing an anchor device in accordance with the teachings of the present invention. In FIG. 1, the seatbelt system includes a passenger restraining belt 10 which is brought diagonally into contact with the passenger 14 seated on the seat 12. In this position the passenger 14 is fastened into the seat 12 by the belt 10.

The inner end 16 of the belt 10 is wound up on a retractor 18 which is fastened to the floor of the vehicle. In the retractor 18, a retractor axle 20, which winds up the inner end 16 of the belt 10, is arranged so as to wind up the belt 10 by the force of a spiral spring 22; but in times of an emergency such as a vehicular collision, etc., the inertial locking mechanism 24 brings a pawl 26 into engagement with ratchet wheel 28 to instantly stop the unwinding of the belt 10.

The outer end 30 of belt 10 is fastened to tongue plate 32 by inserting belt 10 through the opening 34 in tongue plate 32 and folding it back. The tongue plate 32 engages with a buckle device 36 from the front of the vehicle. The buckle device 36 is a buckle device used in normal seatbelt system. By pressing the release button 38, the tongue plate 32 may be easily released from engagement and by this means provides a method for releasing the belt 10 during an emergency.

Figure 2:
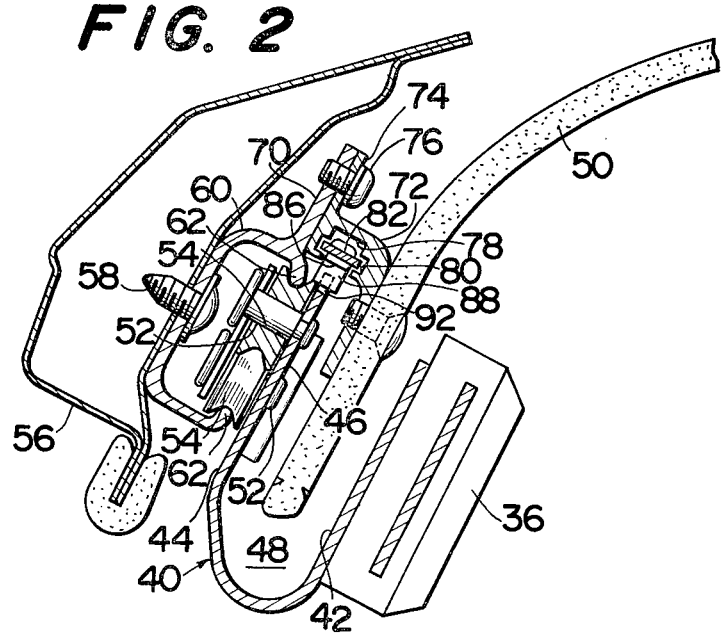
FIG. 2 is a cross sectional view on the line II—II in FIG. 1.

As shown in FIG. 2, (which is a view from the front or back of the vehicle), the buckle device 36 is fastened to the vehicular interior side part 42 of the U-shaped anchor plate 40. The roof side part 44 of the anchor plate 40 is fasten to runner piece 46 which is the truck. The lower side of roof lining 50 is inserted into the space 48 between the vehicle interior side part 42 and the roof side part 44 of the anchor plate 40. The space between the parts 42 and 44 should be a minimum.

Four axles 52 are fastened to the runner piece 46 and roof side part 44 of the anchor plate 40. On each of these axles is provided a wheel 54. These wheels 54 are supported in rail sections 62 of a C-shaped guide rail 60 which is fastened by screws 58 to roof side member 56. The wheels 54 together with the runner piece 46 may move forward or backward along the vehicle travelling along the guide rail 60.

Furthermore, the front end of a narrow belt 66 is fastened to the rear end of runner piece 46 by inserting it through an opening 64 in the rear end of the runner 46. The other end of the narrow belt 66 is wound up on a retractor 68 which is fastened to the roof side member 56 at the rear of the guide rail 60. In the same manner as retractor 18 described previously, the retractor 68 has a retractor axle 20, spiral spring 22, inertial lock mechanism 24, pawl 26 and ratchet wheel 28 and therefore can stop the unwinding of the narrow belt 66 in times of the vehicular emergency and can securely absorb the collision energy of the passenger 14 transmitted by runner piece 46 from the belt 10.

Figure 4:
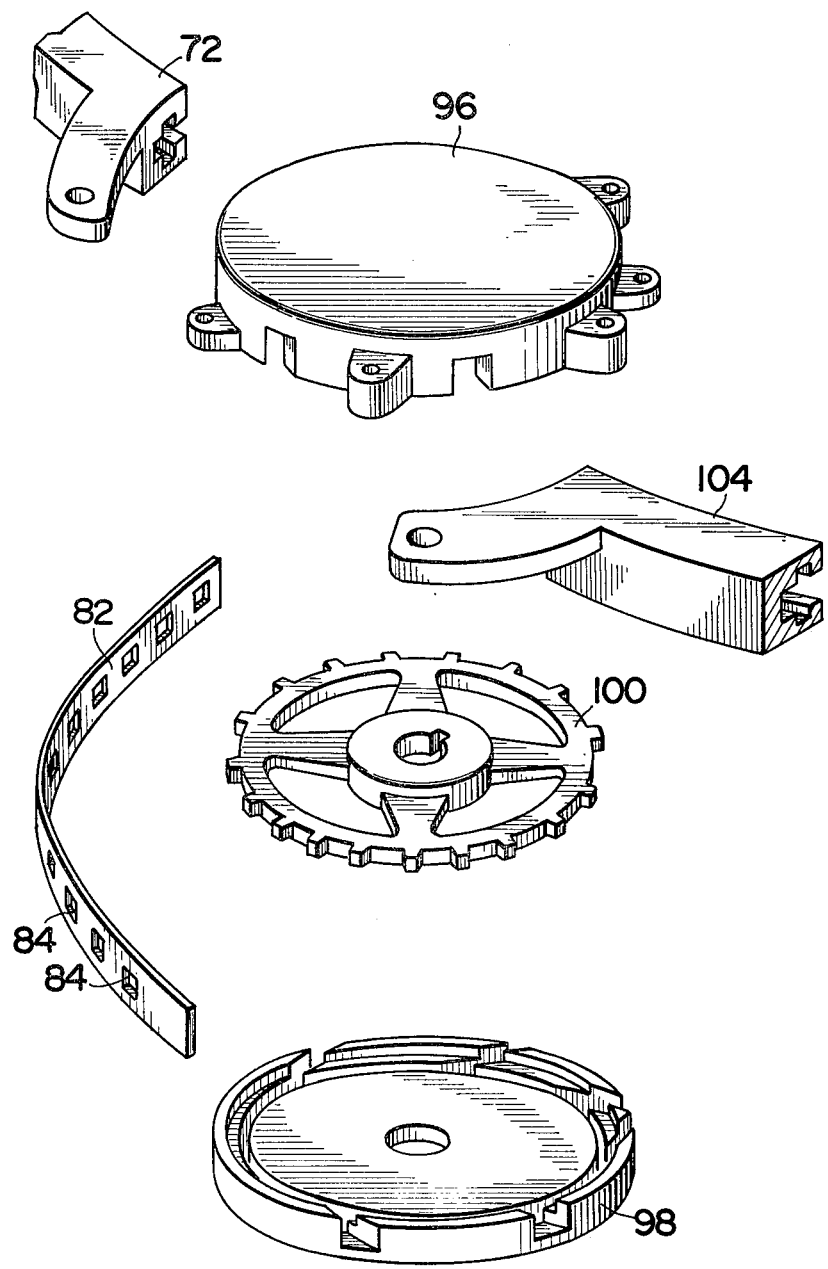
FIG. 4 is an exploded close-up view illustrating a sprocket housing, sprocket wheel, etc. of a driving mechanism.

As shown in FIG. 2, flange section 74 of slide rail 72 is fastened to flange 70, which extends from one side of guide rail 60, by means of screws 76. Slide rail 72 is mounted longitudinally in the vehicle along guide rail 60. This slide rail 72 has a rectangular groove 78 opened along its underside and slide grooves 80 which widen the rectangular groove 78 provided in both side walls of the rectangular groove 78 at a point midway down the depth of the rectangular groove 78. As shown in FIG. 4, thick tape 82 is inserted into the slide grooves 80 so that it can slide in slide grooves 80.

Figure 3:
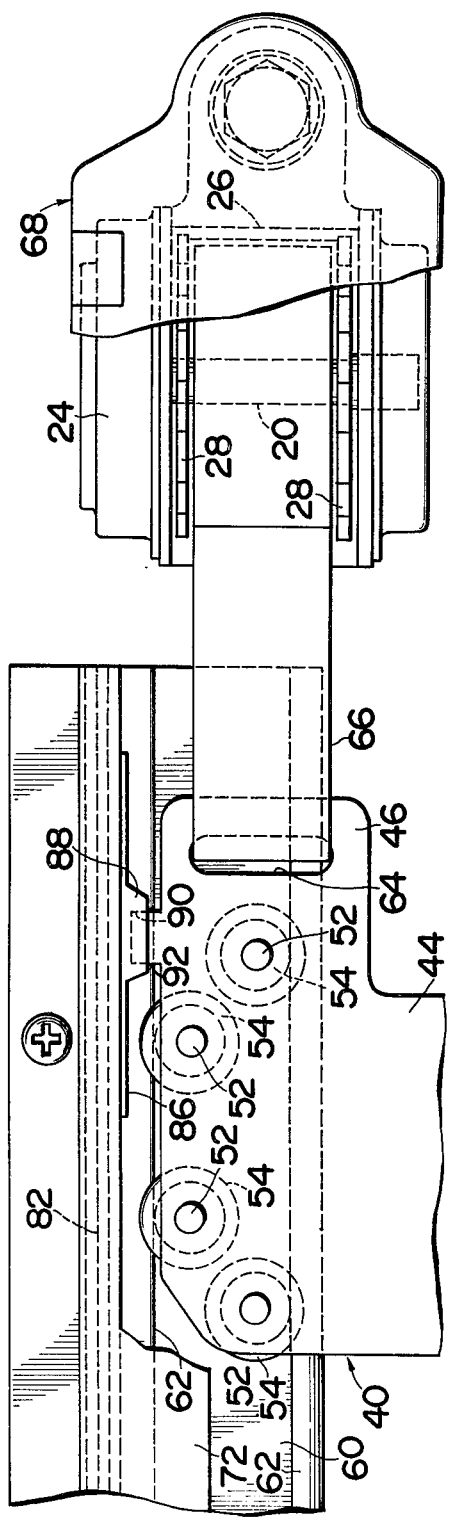
FIG. 3 is a partial enlargement showing the situation where the runner piece has moved to the rear of the vehicle.

The thick tape 82 is made from a synthetic resin and plurality of openings 84 are formed at appropriate intervals along its length. Furthermore, as shown in FIGS. 2 and 3, a sliding block 86 is fastened to the thick tape 82. A protrusion 88 extends from the sliding block 86 in the direction of the floor of the vehicle and protrusion 92, extending upward from the runner piece 46, is received in an indentation 90 formed in the protrusion 88. Therefore, when thick tape 82 slides in slide grooves 80, runner piece 46 also moves along with the tape 82.

As shown in FIG. 1, slide rail 72 extends further towards the front of the vehicle beyond the end of guide rail 60 and extends down front pillar 94 to connect to sprocket housing 96 which is fastened to the lower end of the front pillar. As shown in FIG. 4, the sprocket housing 96 includes a sprocket wheel 100 provided in the space between the sprocket housing 96 and the lid 98. The openings 84 of the thick tape 82 engage the sprocket wheel 100. The sprocket wheel 100 is moved by a reversible motor 102 fastened to the inside front pillar 94. The reversible motor 102 operates the sprocket wheel 100 such that when the passengers opens the door in order to get in or get out, the reversible motor 102 turns counterclockwise; while when the passenger closes the door after seating himself, the reversible motor turns clockwise. In each instance, the reversible motor 102 rotates a fixed number of revolutions. The passive seatbelt system further includes a slide rail 104 to receive thick tape 82 as it is extruded from sprocket housing 96.

For the purposes of describing an operation, the condition shown by the double-dotted interrupted lines in FIGS. 1 and 3 are the normal operating conditions of the seatbelt system when the passenger 14 has the belt 10 fastened. In this normal situation when the passenger 14 changes his driving position, the inner end 16 of the belt 10 unwinds opposing the retracting force of the spiral spring 22 in retractor 18 and he may freely change his driving position.

Further, in an emergency conditions such as a vehicular collision, etc., the unwinding of the inner end 16 of the belt 10 and narrow belt 66 is instantly stopped by the operation of the inertial locking mechanism in both retractors 18 and 68 to thereby securely restrain passenger 14 with the belt 10 and guarantee the passenger's safety. When the passenger wishes to escape from the vehicle after a vehicular collision, he need only press the release button 38 of the buckle device 36 and the tongue plate 32 can easily be separated from the buckle device 36.

In operation, when the passenger wishes to exit the vehicle, he needs only open the door. Opening the door causes the thick tape 82 to be moved in the direction indicated by the arrow A in FIG. 1 by the motor 102 turning the sprocket wheel 100 in a counterclockwise direction in FIG. 1. The thick tape 82, via sliding block 86 to which it is fastened, move the runner piece along the guide rail 60 to the front of the vehicle to the position shown by the solid lines in FIG. 1. As a result, a space for the passenger 14 to exit is formed between the belt 10 and the passenger seat 12. In this situation, the forward movement of the runner piece 46 is limited by the fact that the front end of the guide rail 60 is connected via roof side member 56 to the front pillar 94. Since the roof lining 50 lines roof side member 56, the maximum forward movement of the runner piece 46 is limited. However, as shown in FIG. 2, anchor plate 40 is U-shaped and its central space 48 wraps around the roof lining 50 extending towards the interior of the vehicle and the outer end 30 of the belt 10 fastened to the interior side part 42 via the buckle device 36 and tongue plate 32. By this means, tongue plate 32, which protrudes to the front of the vehicle from the interior side part 42 of anchor plate 40, extends forward along the roof lining 50 and front pillar 94 whereby as shown in FIG. 1, the other end 30 forms a sufficient passenger exiting space between the belt 10 and the passenger seat 12 and the passenger 14 may exit easily.

Then, when a passenger wishes to reenter the vehicle, the passenger may rapidly and comfortably seat himself since the space is maintained in the same way. Now, when the passenger closes the door after seating himself, the motor 102 reverses and sprocket housing 96 moves the thick tape 82 in a direction opposite to that of the arrow A. In this way, runner piece 46 moves toward the rear of the vehicle along guide rail 60 to bring the belt 10 diagonally into contact with the seated passenger 14 and, as shown by the double-dotted interrupted line in FIG. 1, automatically fastens the belt about the passenger.

In the above-described embodiment, the interior side section 42 of anchor plate 40 is fastened to the other end of the belt 10 by a buckle device 36, but the design of the present invention is not limited to such construction. It is also possible for the outer end to be fastened directly to the anchor plate 40. In such a case, it is necessary that the anchor plate 40 be able to move as far towards the front of the vehicle as the position where the tongue plate in the above-described embodiment went. Also, the present invention is not limited to the use of only a thick tape for moving the truck runner and they also use other transmission means such as a wire, etc.

As is described above, the anchor device for the seatbelt system of the present invention has a C-shape when seen from the front or rear of the vehicle, the interior side piece of the anchor device is attached to the outer end of the belt 10, the roof side piece of the anchor device is fastened to a roof side piece and the central region of the anchor device has the lining inserted therein. As a result with this construction, the outer end of the belt 10 moves further towards the front of the vehicle than the runner piece and provides additional space for the passenger to exit or enter the vehicle.

It should be apparent to one skilled in the art that the above-described embodiment is but one of the many possible specific embodiments which represent the application of the principles of the present invention. Numerous and varied other arrangements can be readily devised by those skilled in the art without departing from the spirit and scope of the invention.

I claim:

1. An anchor device for seatbelt systems which automatically fastens or unfastens the belt about a passenger in a motor vehicle comprising:
   a guide rail fastened to said vehicle's roof side in the longitudinal direction of the vehicle;
   a runner piece supported on said roof side via the guide rail and guided along the guide rail;
   an anchor plate which is U-shaped in cross-section and to one side of which one end of the passenger restraining belt is coupled, the other side of the anchor plate being secured to said runner piece;
   a slide rail fastened along said guide rail;
   a plastic tape guided in said slide rail and attached to said runner piece;
   a driving means for driving said plastic tape to the front or rear of said vehicle; and
   a roof lining secured to said slide rail such that said runner piece is supported by said roof lining through said slide rail, said roof lining being inserted into an opening in said U-shaped anchor plate such that said other side of the anchor plate is disposed between said roof lining and said roof side member.

2. An anchor device according to claim 1 wherein said runner piece moves forward or backwards along said vehicle's roof side.

3. An anchor device according to claim 2 wherein an outer end of said passenger restraining belt is coupled to said anchor plate by a tongue plate and a buckle device which engages with said tongue plate whereby the outer end of said belt may be separated from said anchor plate.

4. An anchor device according to claim 3 wherein said tongue plate engages with said buckle device by insertion from a vehicular front side of said buckle device and is disposed further towards the front of said vehicle than said buckle device and when said anchor plate moves as far towards the front of said vehicle as possible, the tongue plate lies along the roof lining and front pillar at a position further forward than said buckle device.

5. An anchor device according to claim 1 wherein said runner piece and anchor plate are formed of one piece from thin sheet.

6. An anchor device according to claim 5 wherein a plurality of wheels are rotatably coupled to said runner piece and said wheels move forward and backward along said vehicle in the guide rail.

7. An anchor device according to claim 6 wherein a groove is formed along said slide rail to guide said plastic tape.

8. An anchor device according to claim 1 further comprising a narrow belt fastened to said runner piece and a retractor which is coupled to said narrow belt and fastened to a rear of said vehicle and which retracts said narrow belt by a winding force which urges said runner piece towards a rear of said vehicle.

9. An anchor device according to claim 8 wherein said retractor stops the unwinding of said narrow belt during a vehicular emergency and prevents foward motion of said runner piece.

* * * * *